US006782314B2

(12) United States Patent
McBrien et al.

(10) Patent No.: US 6,782,314 B2
(45) Date of Patent: Aug. 24, 2004

(54) METHOD OF DETECTING IN-RANGE ENGINE SENSOR FAULTS

(75) Inventors: Gary M. McBrien, Glastonbury, CT (US); Jeffrey S. Mattice, Enfield, CT (US); Raymond D. Zagranski, Somers, CT (US)

(73) Assignee: Goodrich Pump & Engine Control Systems, Inc., West Hartford, CT (US)

( * ) Notice: Subject to any disclaimer, the term of this patent is extended or adjusted under 35 U.S.C. 154(b) by 0 days.

(21) Appl. No.: 10/290,621

(22) Filed: Nov. 8, 2002

(65) Prior Publication Data

US 2003/0139860 A1 Jul. 24, 2003

Related U.S. Application Data

(60) Provisional application No. 60/333,309, filed on Nov. 16, 2001.

(51) Int. Cl.[7] .............................................. G06F 19/00
(52) U.S. Cl. ............................. 701/34; 701/31; 701/102
(58) Field of Search ........................... 701/34, 31, 29, 701/100, 101, 102; 73/35.03, 35.06, 118.1

(56) References Cited

U.S. PATENT DOCUMENTS 5,469,735 A * 11/1995 Watanabe .................. 73/118.1

5,718,111 A   2/1998  Ling et al. ................. 60/39.02
6,073,262 A   6/2000  Larkin et al. ............... 714/736

OTHER PUBLICATIONS

U.S. Provisional patent application Ser. No. 60/333,309 filed Nov. 16, 2001.

* cited by examiner

Primary Examiner—Tan Q. Nguyen
(74) Attorney, Agent, or Firm—Scott D. Wofsy; Edwards & Angell, LLP

(57) ABSTRACT

The subject invention is directed to a new and useful method of detecting in-range engine sensor faults for a gas turbine engine associated with a helicopter. The method includes the steps of computing engine shaft horsepower for a plurality of engine sensor, computing a first mean horsepower from the plurality of engine sensors, computing the horsepower deviation from the first mean horsepower for each engine sensor, computing a horsepower deviation ratio for each engine sensor relative to all other engine sensors, disabling the engine sensor with the largest deviation from the first mean horsepower, computing a second mean horsepower, computing the horsepower deviation from the second mean horsepower for each engine sensor, re-computing the horsepower deviation ratio for each engine sensor relative to all other engine sensors, comparing the horsepower deviation ratios to predefined limits, and declaring a sensor fault if the horsepower deviation ratio for an engine sensor exceeds a predefined limit.

7 Claims, 20 Drawing Sheets

METHOD OF DETECTING IN-RANGE ENGINE SENSOR FAULTS

CROSS-REFERENCE TO RELATED APPLICATION

The subject application claims the benefit of priority to U.S. Provisional Patent Application Ser. No. 60/333,309 filed Nov. 16, 2001, the disclosure of which is herein incorporated by reference in its entirety.

GOVERNMENT RIGHTS STATEMENT

The U.S. Government has a paid-up license in this invention and the right in limited circumstances to require the patent owner to license others on reasonable terms as provided for by the terms of DAAH10-99-2-0005, awarded by the U.S. Department of the Army.

BACKGROUND OF THE INVENTION

1. Field of the Invention

The subject invention relates to engine sensor fault detection, and more particularly, to a method of detecting in-range sensor faults in helicopter gas turbine engines.

2. Background of the Related Art

Field experience with Full Authority Digital Electronic Control (FADEC) systems on helicopter gas turbine engines has shown that in-range, intermittent or slowly drifting sensor faults can remain undetected during conventional range and rate tests, when redundant engine sensors are not available for third party voting tests. In other words, in instances when only individual sensors are available, the intermittent or slowly drifting faults may not trip the rate threshold. Consequently, even though the engine control system may appear to be fully functional and capable for service at the time of launch, the dispatch capability of the helicopter may actually be limited.

It would be beneficial therefore, to provide a method of determining whether an in-range intermittent or slowly drifting sensor fault is indeed plausible in the absence of redundant, like sensors. With such a method in place, the loss of redundant, like sensors would not be critical to the safe operation of the engine and helicopter.

SUMMARY OF THE INVENTION

The subject invention is directed to a new and useful method of detecting in-range engine sensor faults in helicopters. More particularly, the method of the subject invention compares each of a plurality of engine sensors to all of the other sensors on the engine to determine whether any in-range, intermittent or slowly drifting sensor fault is indeed plausible. Thus, the loss of a redundant, like sensors would not be critical to the safe operation of the engine and helicopter.

The method of the subject invention includes the initial step of sampling input signals from a plurality of engine sensors, including sensors associated with the power turbine and main rotor speeds, high and low pressure spool speeds, compressor discharge pressure, turbine inlet gas temperature and fuel flow or burn rates. The method further includes the steps of computing the engine shaft horsepower for each engine sensor based upon the sampled input signal therefrom, computing a first mean horsepower from the plurality of engine sensors, computing the horsepower deviation from the first mean horsepower for each engine sensor, and computing a horsepower deviation ratio for each engine sensor relative to all of the other sampled engine sensors.

The method further includes the steps of disabling the engine sensor with the largest deviation from the first mean horsepower based upon the horsepower deviation ratio thereof, and computing a second mean horsepower after disabling the sensor with the largest deviation from the first mean horsepower. Thereafter, the horsepower deviation from the second mean horsepower is computed for each engine sensor, and the horsepower deviation ratio for each engine sensor relative to all other engine sensors is re-computed. The method further includes the steps of comparing the horsepower deviation ratios to predefined go/no-go limits, and declaring a sensor fault if the horsepower deviation ratio for an engine sensor exceeds a predefined limit.

Preferably, the step of computing engine shaft horsepower with respect to power turbine speed, main rotor speed, high pressure compressor discharge pressure and at least one fuel flow rate includes the step of conditioning the sampled power turbine speed signal, main rotor speed signal, high pressure compressor discharge pressure signal and the at least one fuel flow rate signal using respective first order lag filters.

Preferably, the step of computing engine shaft horsepower with respect to power turbine speed and main rotor speed includes multiplying the filtered power turbine speed signal and the filtered main rotor speed signal by the engine shaft torque signal, after the engine shaft torque signal has been conditioned by a first order lag filter.

Preferably, the step of computing engine shaft horsepower with respect to high pressure spool speed, low pressure spool speed and high pressure compressor discharge pressure includes applying respective engine performance maps to the high pressure spool speed signal, the low pressure spool speed signal and the high pressure compressor discharge pressure signal. Similarly, the step of computing engine shaft horsepower with respect to high pressure compressor discharge pressure and at least one fuel flow rate further includes applying respective engine performance maps to the conditioning high pressure compressor discharge pressure signal and the at least one fuel flow rate signal.

These and other aspects of the engine sensor fault detection methodology of the subject invention will become more readily apparent to those having ordinary skill in the art from the following detailed description of the invention taken in conjunction with the drawings described herein below.

BRIEF DESCRIPTION OF THE DRAWINGS

So that those having ordinary skill in the art to which the subject invention pertains will more readily understand how to employ the system and method of the subject invention, preferred embodiments thereof will be described in detail hereinbelow with reference to the drawings, wherein.

DETAILED DESCRIPTION OF PREFFERED EMBODIMENTS

Several engine operating parameters will be referred to in the description of the invention which follows. These engine operating parameters include the following:

QS—Engine Shaft Torque (SHP—Shaft HP)
NP—Power Turbine Speed
NR—Main Rotor Speed
NH—High Pressure Spool Speed
NL—Low Pressure Spool Speed
$P_3$—High Pressure Compressor Discharge Pressure
$T_{4.5}$—Power Turbine Inlet Gas Temperature
WFCL—Closed Loop Fuel Flow
WFOL—Open Loop Fuel Flow
WFTF—TF Fuel Flow
DELTA—Ratio of Ambient Temperature to Sea Level Pressure
THETA—Ratio of Ambient temperature to Standard Day temperature, where the temperatures are in degrees Rankine.
RTHETA—Square Root of THETA.

Through experience, it has been determined that engine shaft horsepower can be used as a common denominator to equate all engine sensors to each other. However, because the individual horsepower relationships are imprecise (i.e., they vary with rotor/power turbine speed and engine acceleration/deceleration rate) this methodology is "somewhat fuzzy" in nature.

In the method of the subject invention, the mean estimated horsepower from all of the engine sensors is used as the true value. However, the true value is not really the truth (due to the fuzzy horsepower relationships and potentially failed sensors being included in the average). Therefore, the deviation of each engine sensor from the mean horsepower is compared to the deviation of all of the engine sensors to determine which sensor has failed.

Referring to FIG. 1, by way of example, inspection of the horsepower deviation traces shows that all of the sampled engine sensors are being affected by the intermittent NH sensor because the engine control system is responding to the failed sensor. However, it is also obvious from the traces of FIG. 1, that the NH speed sensor is faulty by the shear magnitude of its deviation relative to all of the other engine sensors.

Figure 1A:
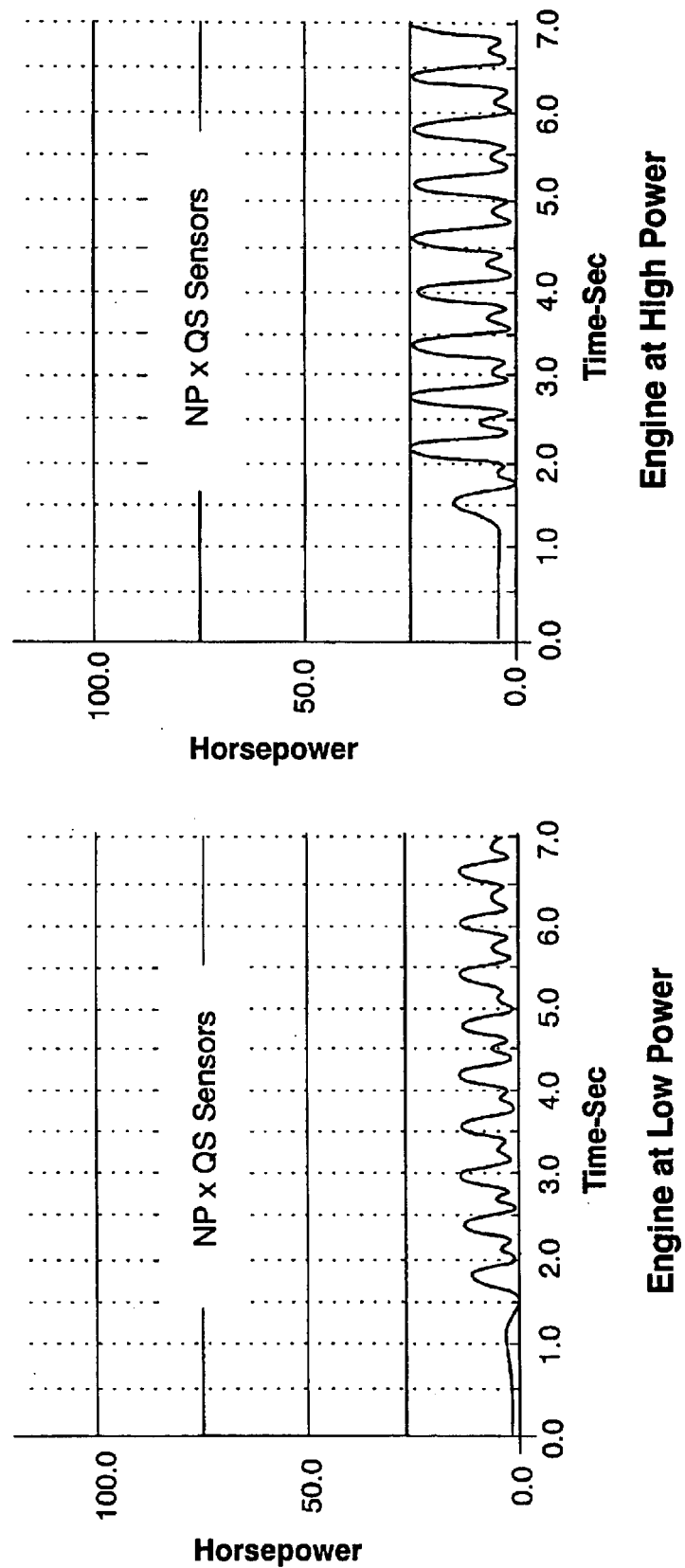
FIG. 1 (includes FIGS. 1A–1G) illustrates graphical traces at low engine power and high engine power of sensor horsepower deviations from the mean horsepower during NP governing with a 1% intermittent NH sensor.
Figure 1B:
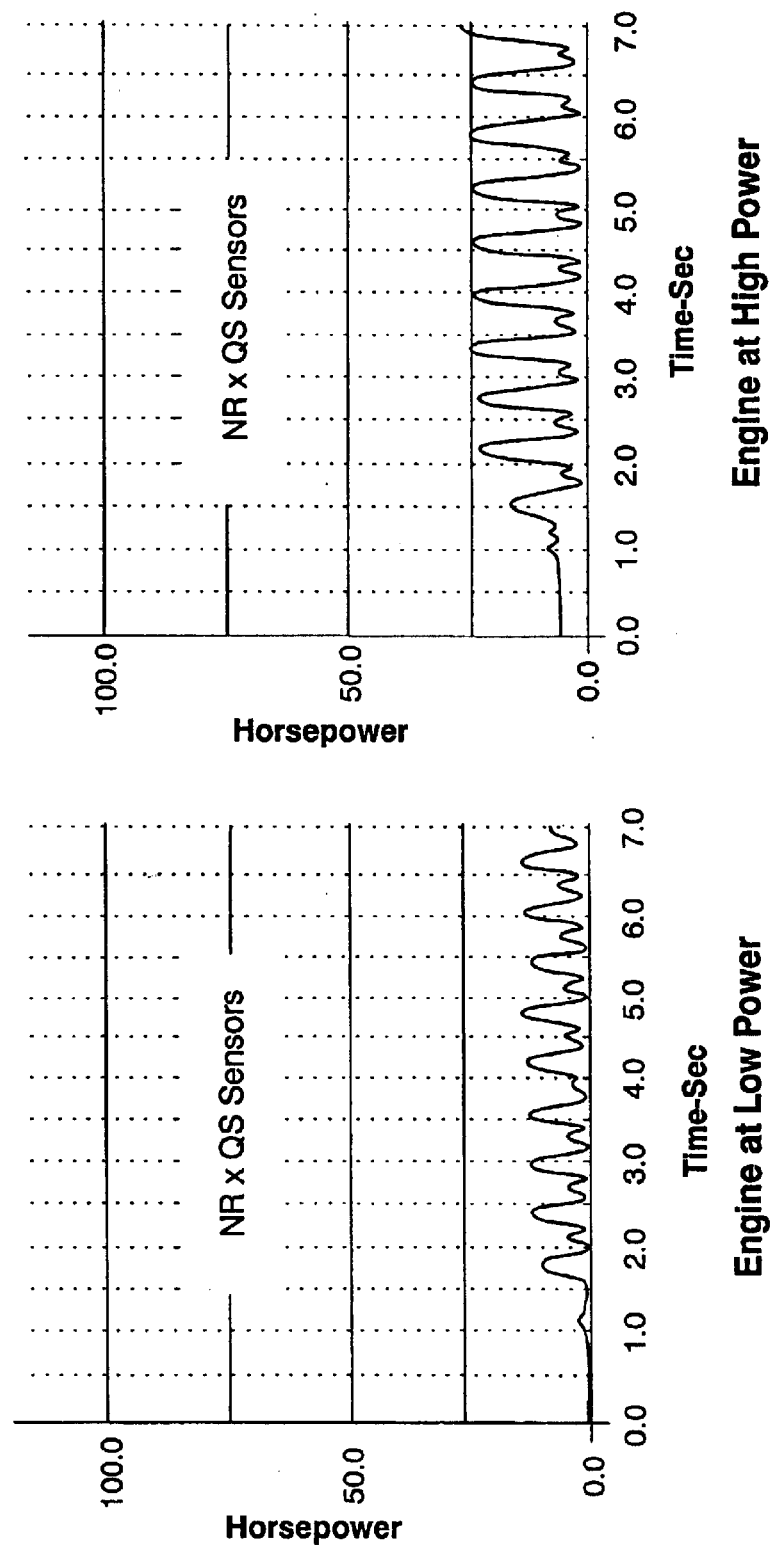
Figure 1C:
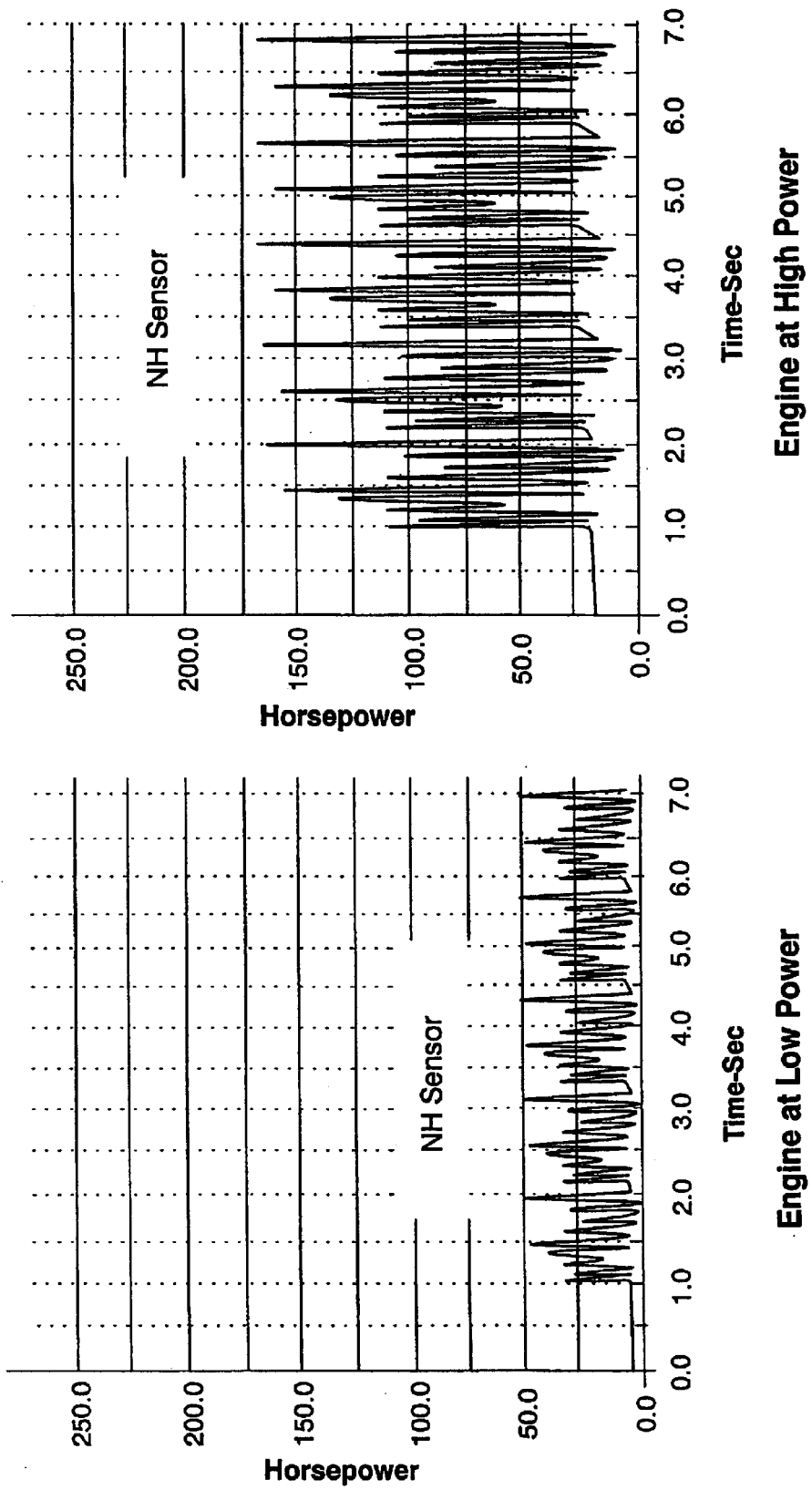
Figure 1D:
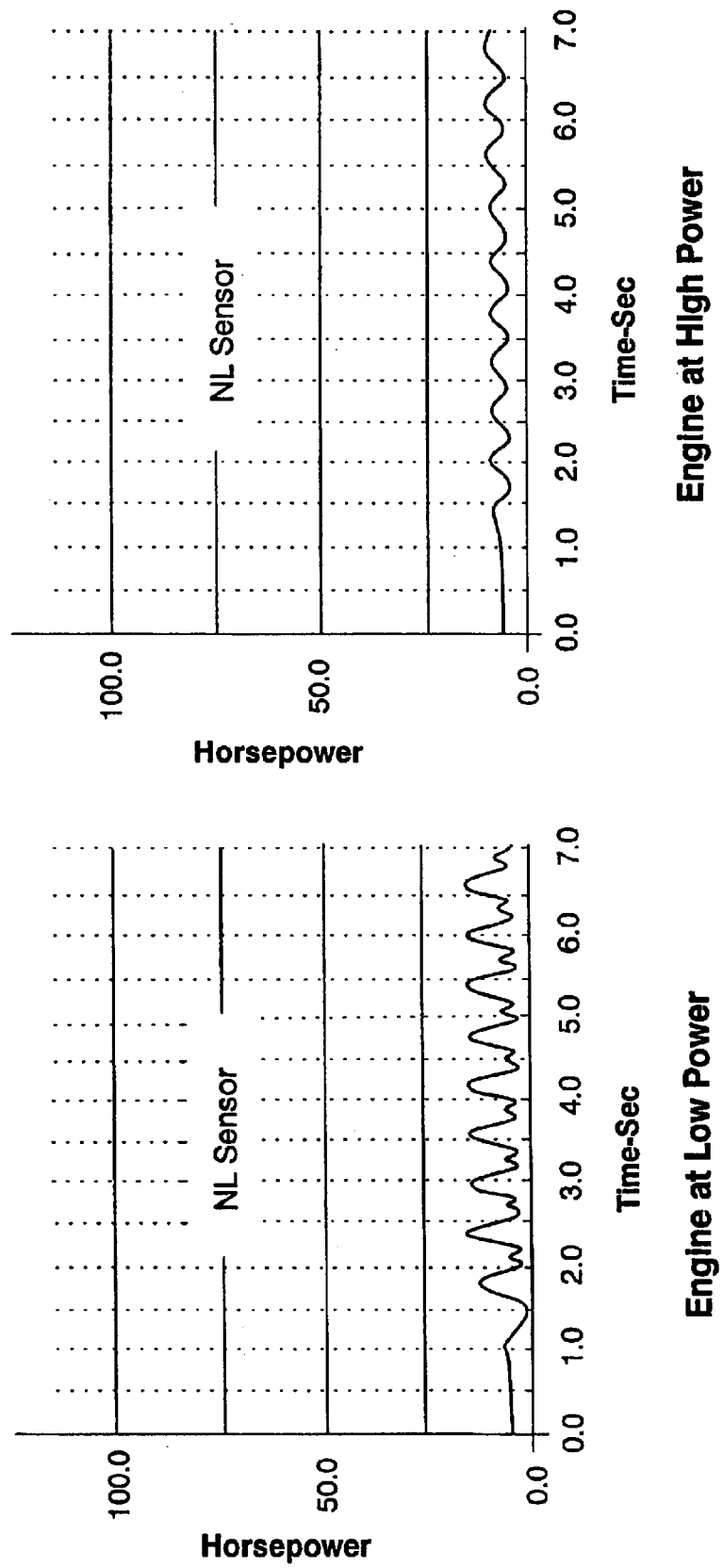
Figure 1E:
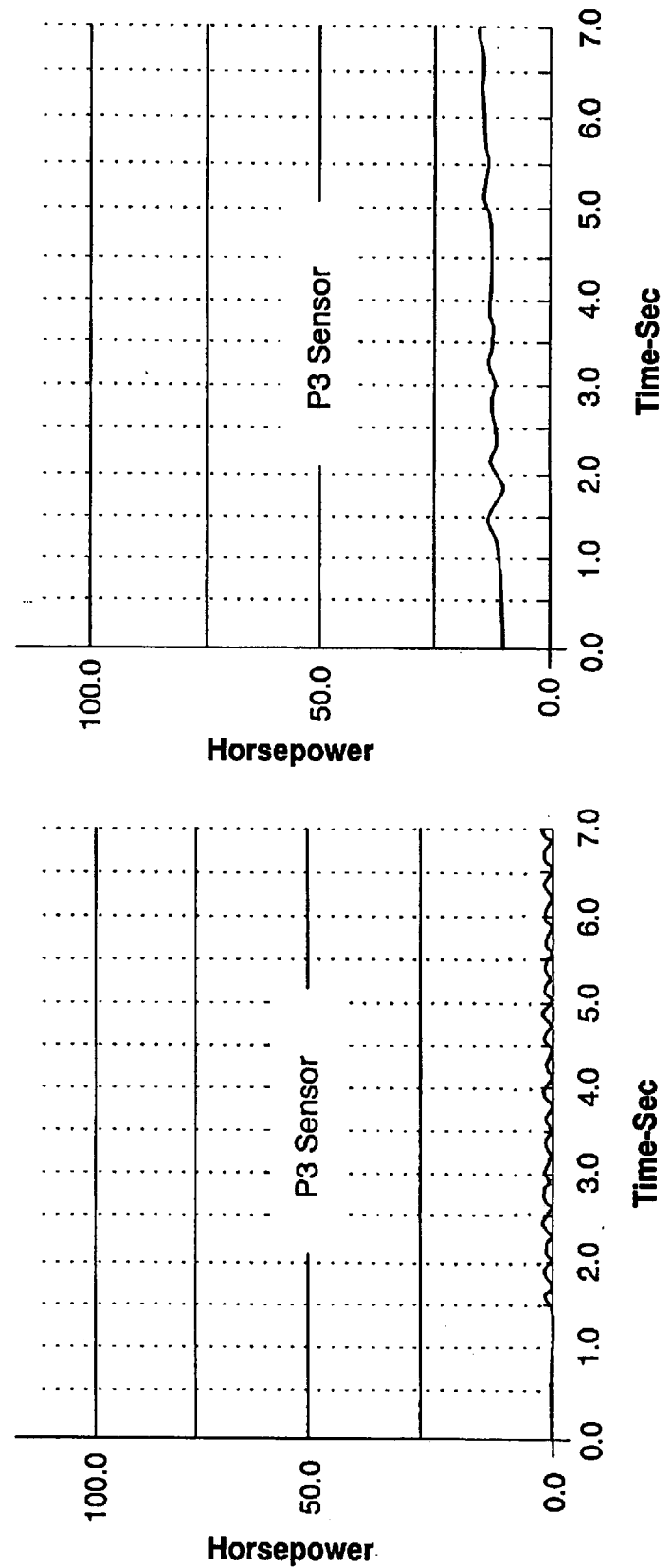
Figure 1F:
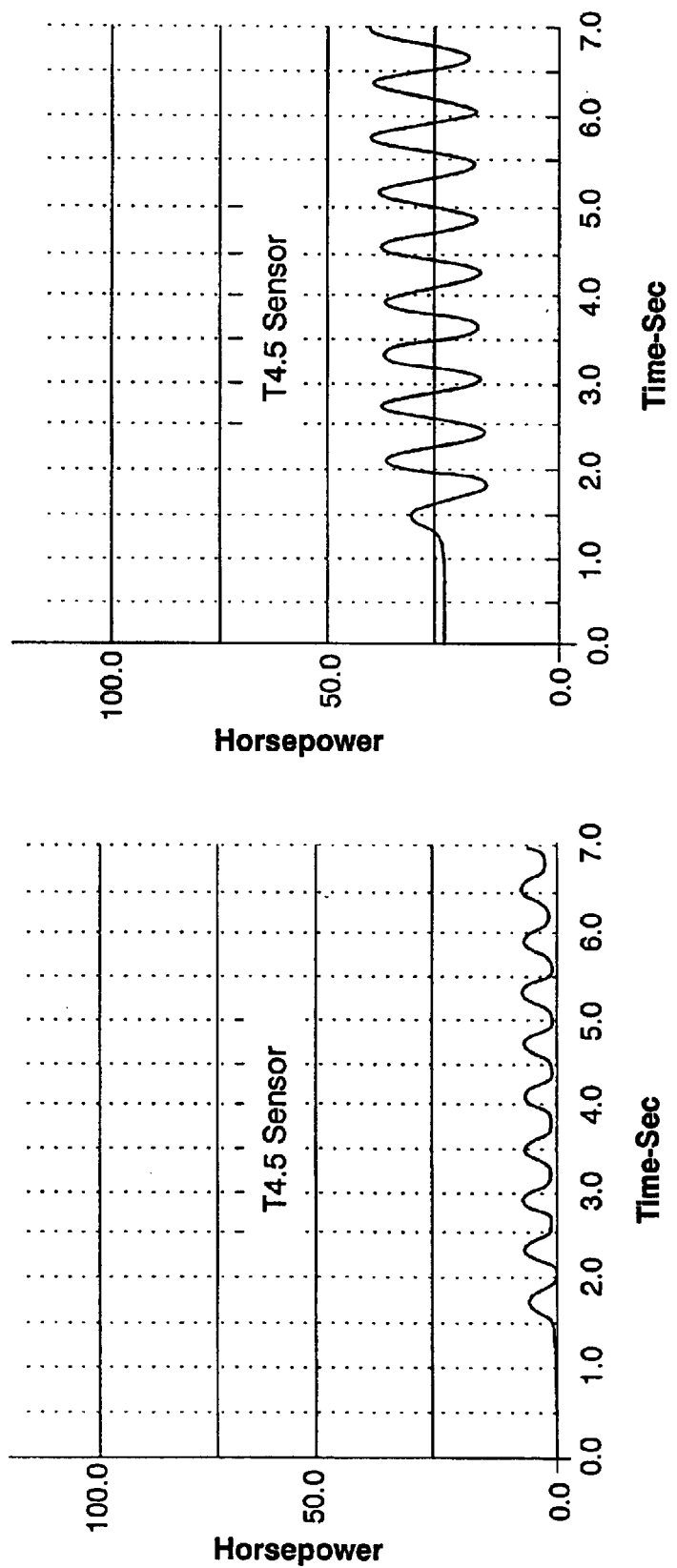
Figure 1G:
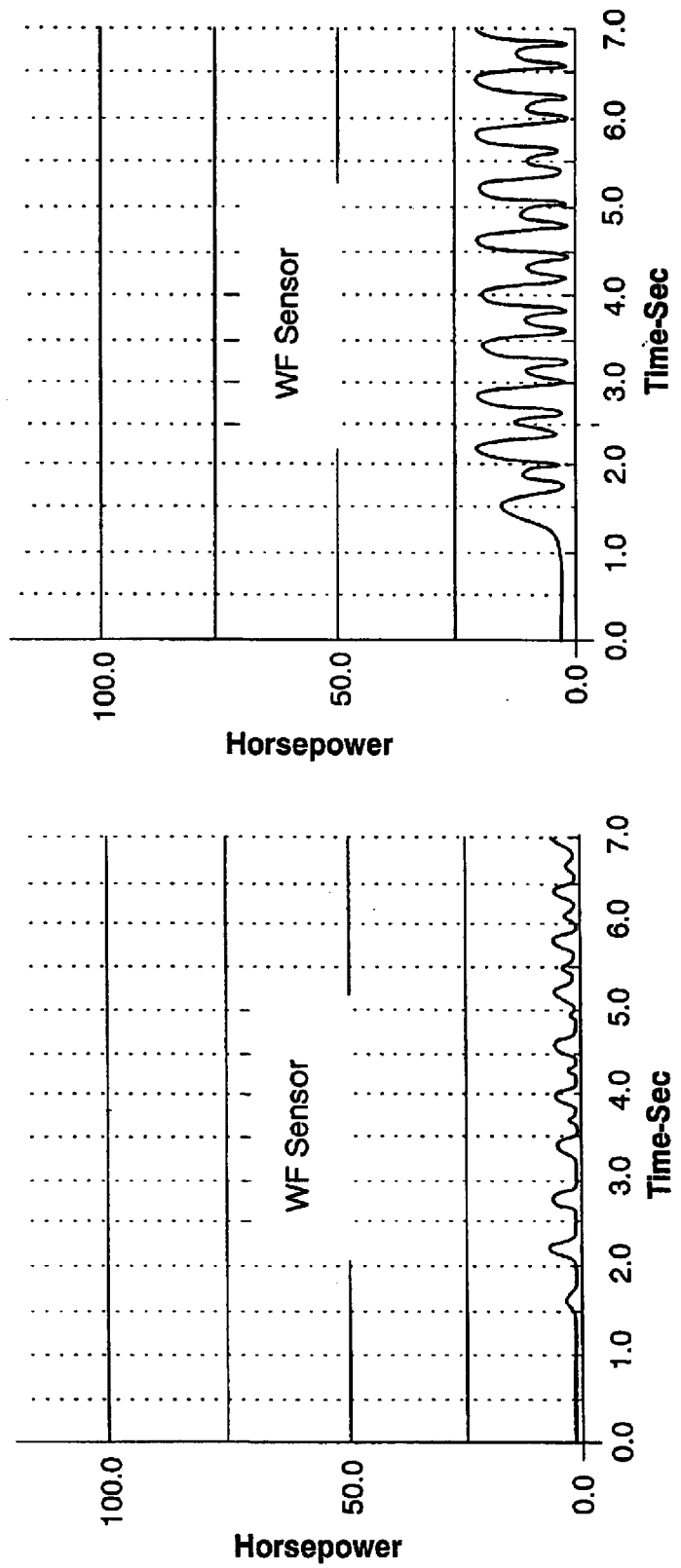
Figure 2:
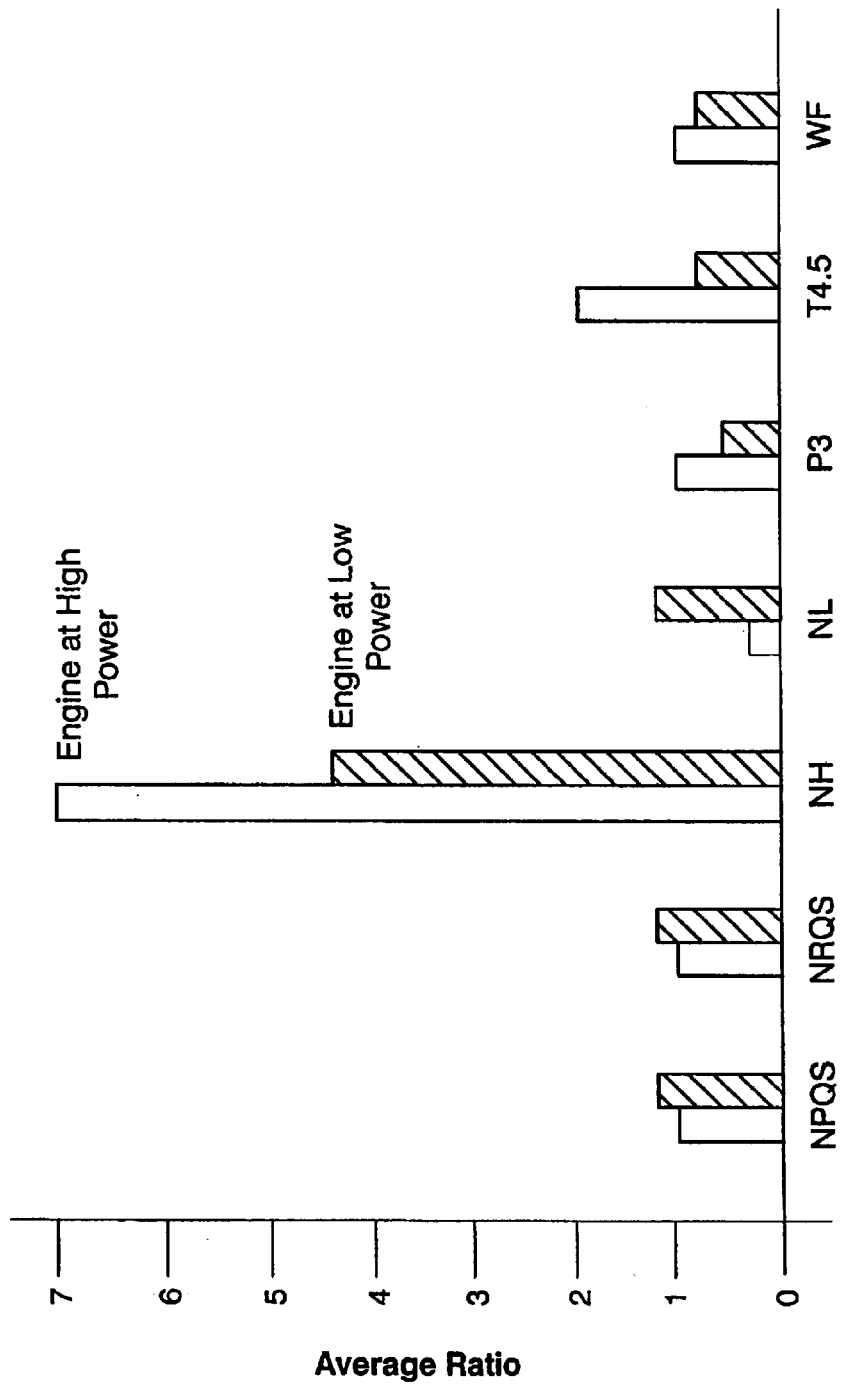
FIG. 2 is a bar graph corresponding to the traces shown in FIG. 2 illustrating the ratiometric comparison of sensor horsepower deviation rations for a 1% intermittent NH sensor.

As shown in FIG. 2, a ratiometric comparison of the horsepower deviation for each sensor relative to all other engine sensors, isolates the failed NH sensor. This "somewhat fuzzy" fault detection logic is capable of detecting in-range, intermittent faults that would have been missed by conventional fault detection algorithms. This reduces the probability of undetected failures and enables time-limited dispatch of the aircraft in cases where redundant sensors are not available to provide normally sufficient fault coverage of the engine control system.

Figure 3A:
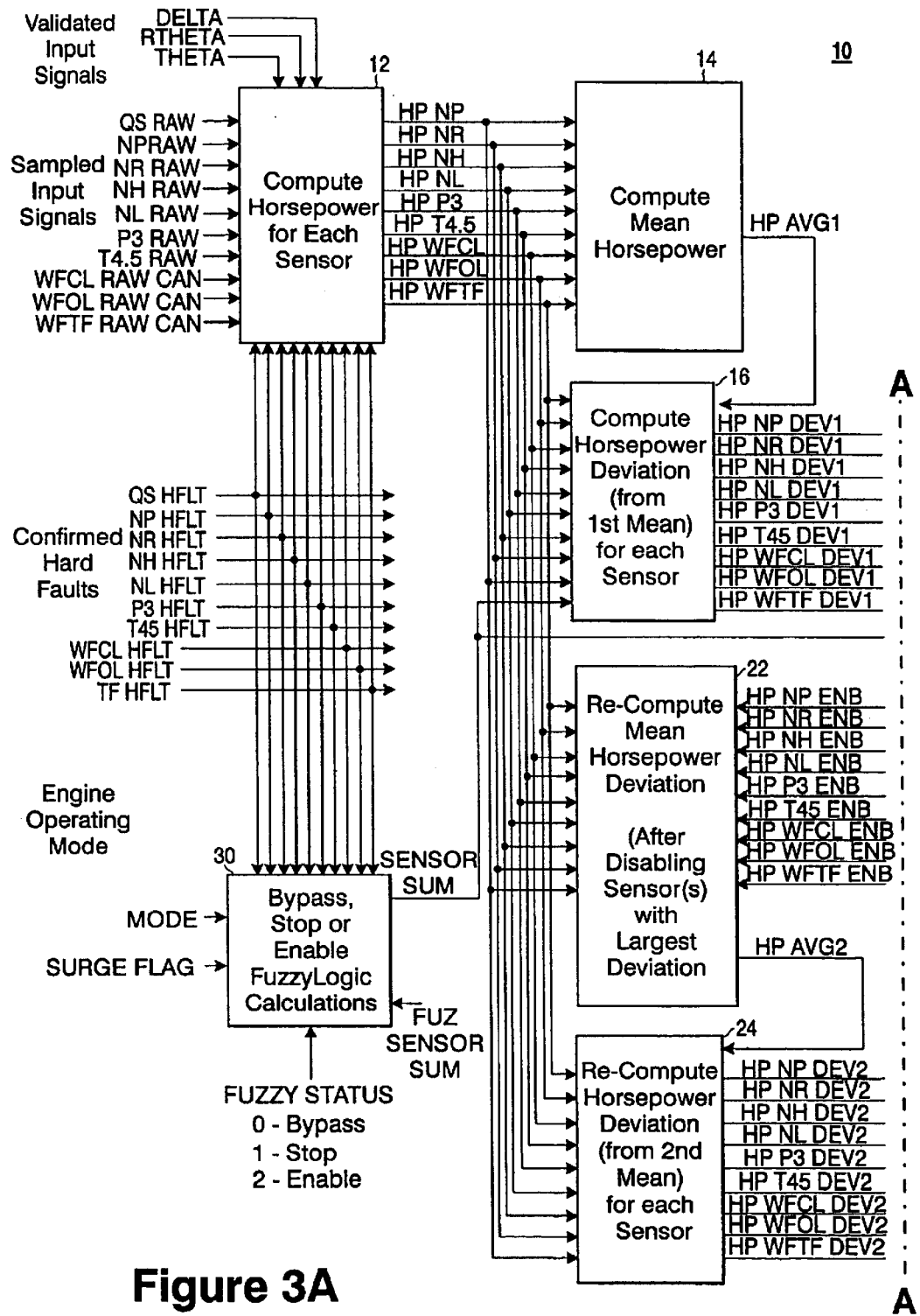
FIG. 3 (includes FIGS. 3A and 3B) is a high level block diagram depicting the computational logic of the fault detection system of the subject invention.
Figure 3B:
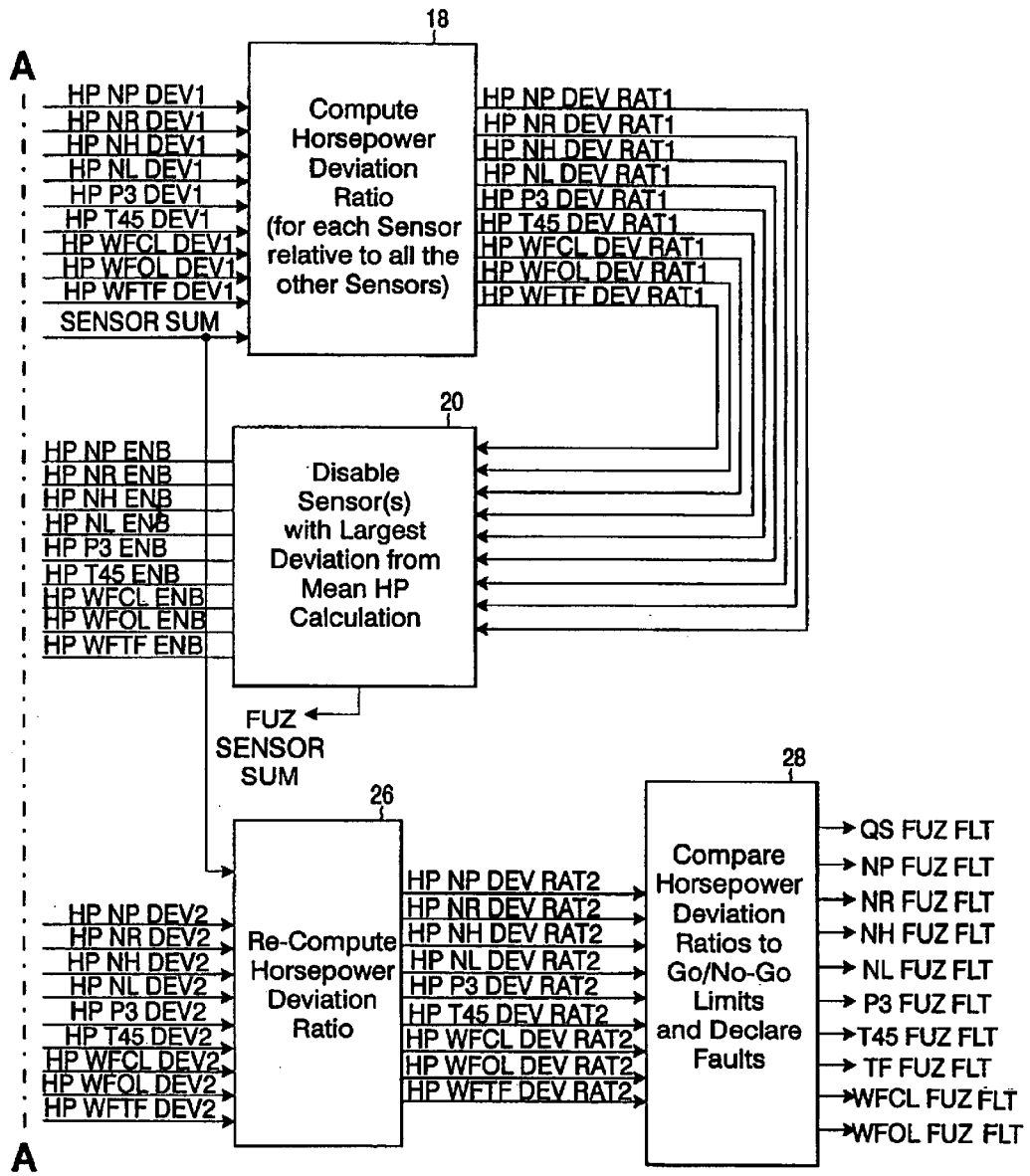

Referring now to the schematic drawings wherein like reference numerals identify similar as aspects of the system of the subject invention, there is depicted in FIG. 3, a high level block diagram illustrating the methodology of the fault detection system of the subject invention. Initially, the system 10 receives sampled signals at logic block 12 from ten different engine sensors. These ten sensors provide raw data input related to QS, NP, NR, NH, NL, $P_3$, $T_{4.5}$, WFCL, WFOL and WFTF. In addition, three validated input signal are received at logic block 12 corresponding to DELTA, RTHETA, and THETA.

At logic block 12, the engine shaft horsepower HP for nine of the ten engine sensors is calculated based upon stored engine data. This data is derived from engine maps or curves generated by the engine manufacturer over time. Those skilled in the art will readily appreciate that QS is used as a multiplier for NP and NR, and is not used independently in computing relationships between sensors.

The nine computed HP values are used at logic block 14 to calculate the mean or average horsepower HP AVG1. The mean horsepower HP AVG1 is then used at logic block 16 to calculate the horsepower deviation HP[SENSOR] DEV1 from the first mean horsepower HP AVG1 for each of the nine engine sensor. At logic block 18, a horsepower deviation ratio HP [SENSOR] DEV RAT1 is computed for each of the nine engine sensors relative to all of the other engine sensors, using the SENSOR SUM as an input. In this initial pass, the SENSOR SUM is equal to nine (9), once again noting that the QS sensor is not used in computing the relationships between the sensors. A ratiometric comparison is then conducted at logic block 20, whereby the nine horsepower deviation ratios are analyzed to determine which sensor has the largest deviation from the mean horsepower HP AVG1. The sensor with the largest deviation is then disabled. The remaining enabled sensors provide the FUZ SENSOR SUM, which is used in later calculations.

At logic block 22, after disabling the sensor with the largest deviation, the horsepower for each of remaining enabled sensors HP [SENSOR] ENB is used to calculate a second mean horsepower HP AVG2. Thereafter, at logic block 24, using the HP AVG2, the horsepower deviation from the second mean horsepower HP [SENSOR] DEV2 is calculated for each of the remaining sensors. At logic block 26, a second horsepower deviation ratio HP [SENSOR] DEV RAT2 is computed for each of the enabled engine sensors relative to all of the other enabled engine sensors. These remaining horsepower deviation ratios are then compared to predefined go/no-go limits at logic block 28, whereby a sensor fault [SENSOR] FUZ FLT is declared if a limit is exceeded by a particular engine sensor.

A more detailed description of the engine sensor fault detection logic illustrated in FIG. 3 follows hereinbelow.

Bypass, Stop or Enable Logic

With continuing reference to FIG. 3, system 10 includes a logic block 30 in which calculations relating to the bypass, stopping or enabling of the fault detection system 10 are performed. The calculations performed at logic block 30 are shown in detail in FIG. 4. The initial calculation is a summation of sensors at summing block 32 which is compared at summing junction 34 to a constant value input equal to the number of sensors being sampled (e.g., 8), resulting in the SENSOR SUM. A second summation is performed at summer 36 to calculate the initial FUZ SENSOR SUM INIT for the first-pass deviation calculation. If the FUZ SENSOR SUM INIT is less than 4, i.e., if four sensors are not available, the fault detection logic of system 10 is bypassed.

Logic block 30 also includes an engine operating mode determination. More particularly, there are four engine operating modes and corresponding values associated therewith, including 1-Normal, 2-Combat, 3-Start and 4-Shutdown. Since there is no horsepower in modes 3 and 4, the fault detection logic of system 10 will be bypassed for mode values greater than or equal to 3. Thus, the fault detection logic of system 10 can only be used in Normal or Combat modes. Similarly, if an engine surge occurs, resulting in a Surge Flag value that is equal to 1, the fault detection logic of system 10 will be bypassed. This will be true during the surge as well as during the period of recovery from a surge.

Figure 4:
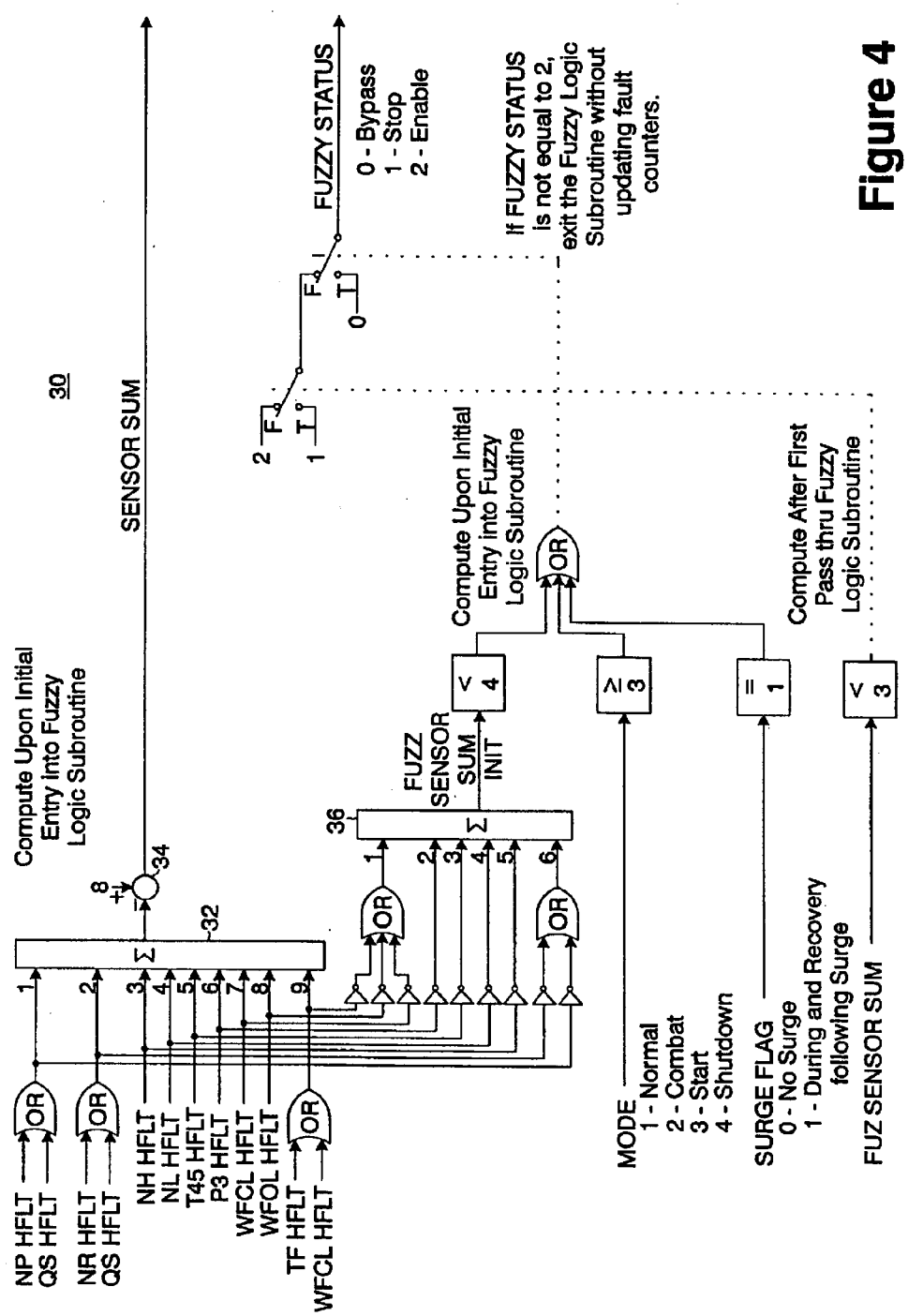
FIG. 4 is a detailed schematic representation of the by-pass, stop or enable logic of the fault detection system of FIG. 3.

Logic block 30 also tests the FUZ SENSOR SUM after the first pass through the fault detection logic of system 10 to determine whether the number of enabled engine sensors is sufficient to proceed. If the FUZ SENSOR SUM is less than 3, the fault detection logic stops, but if the FUZ SENSOR SUM is not less than 3, the fault detection logic is enabled and proceeds. In sum, as illustrated in FIG. 4, if the status is not equal to 2, the fuzzy logic subroutine of the fault detection system 10 is exited without updating the fault counters, which are discussed below with reference to FIG. 7.

First Mean Horsepower Calculation

Figure 5A:
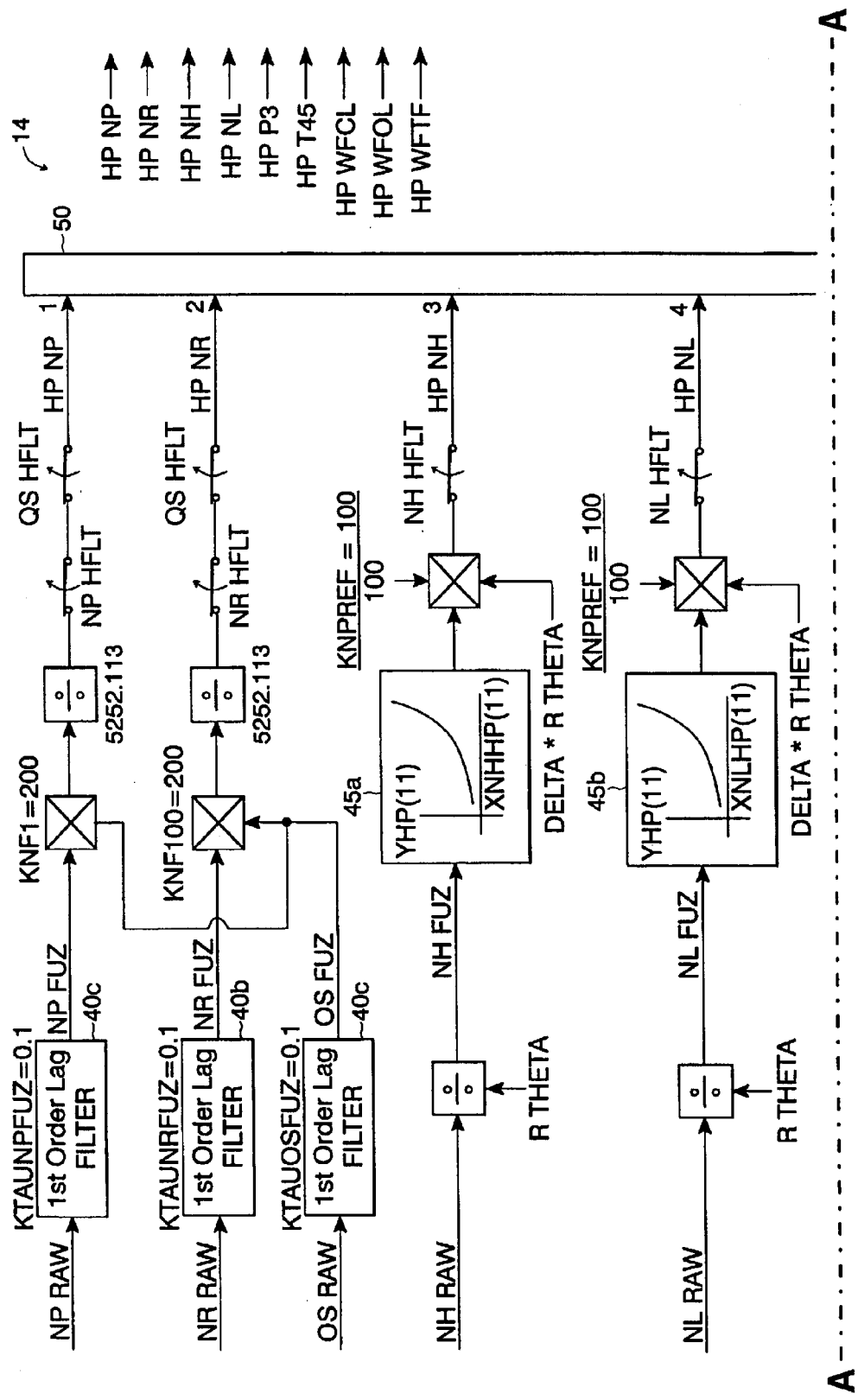
FIG. 5 (includes FIGS. 5A–5C) is a detailed schematic representation of the first mean horsepower calculation logic of the fault detection system of FIG. 3.
Figure 5B:
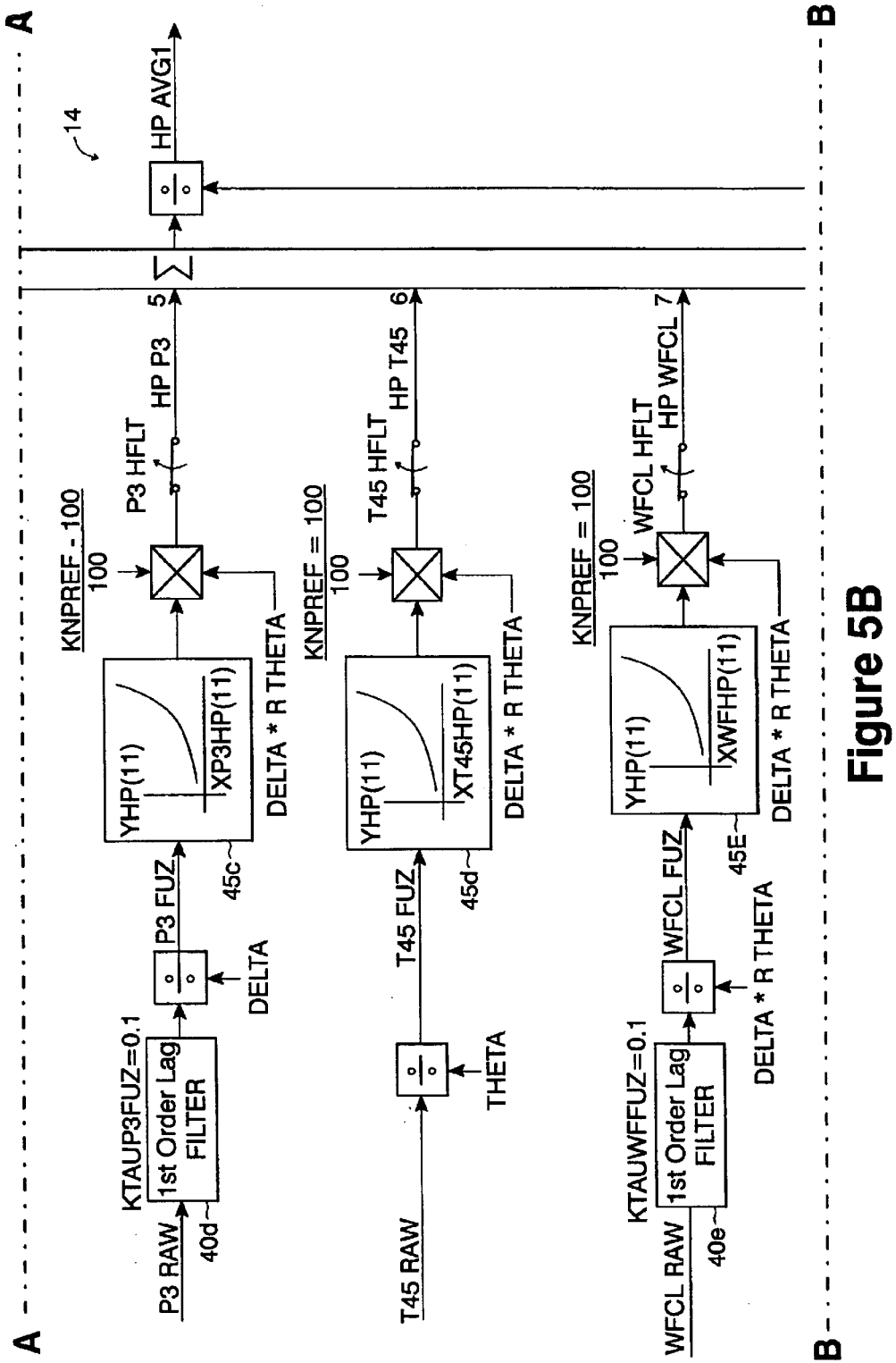
Figure 5C:
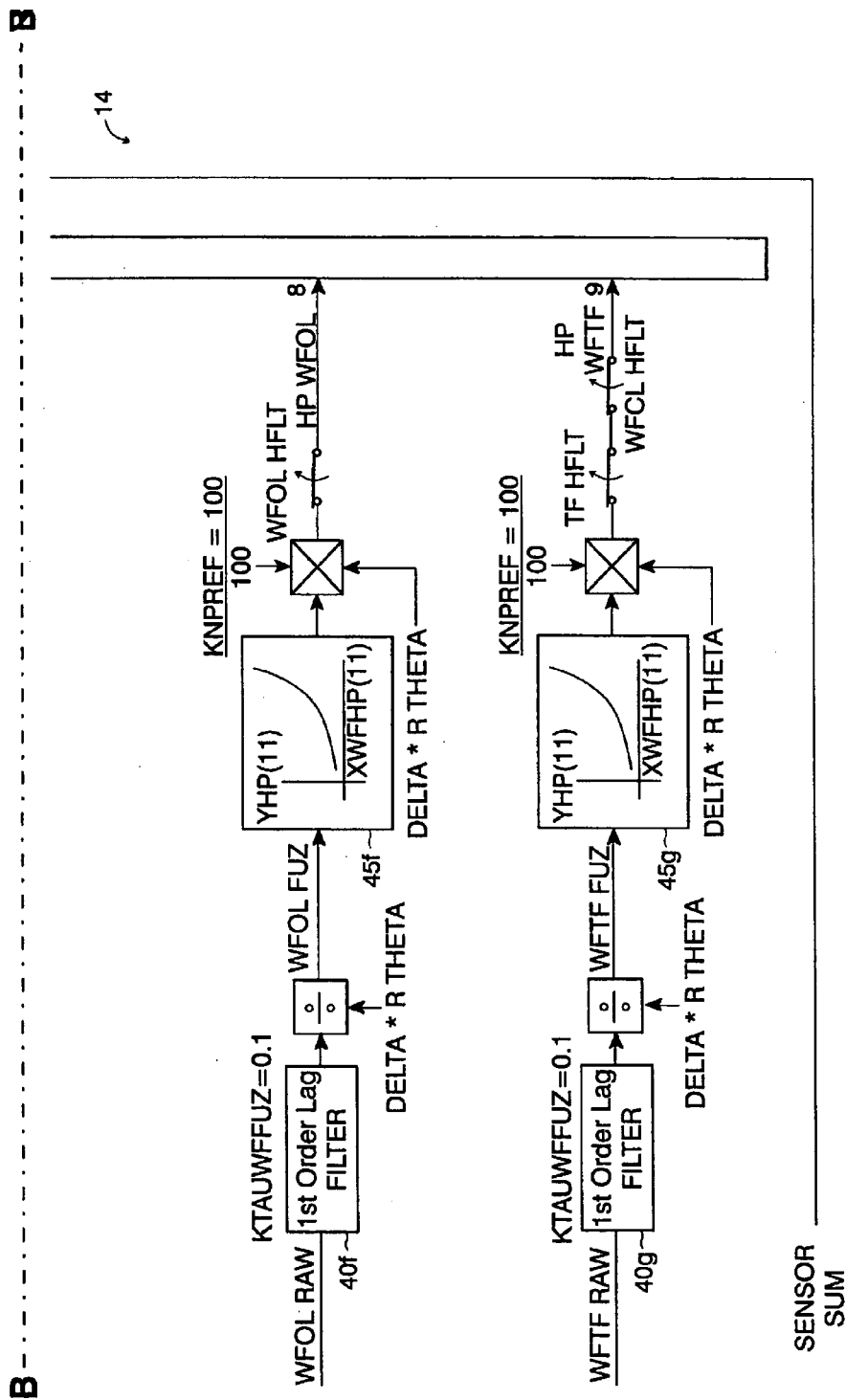

As noted above with reference to FIG. 3, at logic block 14 the mean or average horsepower HP AVG1 is calculated. More particularly, referring to FIG. 5, to calculate HP AVG1 each of the ten raw sampled sensor readings corresponding to QS, NP, NR, NH, NL, $P_3$, $T_{4.5}$, WFCL, WFOL and WFTF are conditioned and summed. Specifically, the sampled NP RAW, NR RAW and QS RAW sensor signals are conditioned by respective first order lag filters 40a–40c, to develop more accurate representations of the values for these sensors. The filter output QS FUZ and a common reference value KNF 1=209 (rpm/1% speed) are then used as multipliers with the lag filter outputs NP FUZ and NR FUZ, respectively. Then, the two resultant values are each divided by a units conversion factor (5252.113) to arrive at the horsepower values HP NP and HP NR which pass through respective dual hard fault trips (NP HFLT and QS HFLT) and (NR HFLT and QS HFLT) before submission to a summation block 50.

The sampled spool speeds NH RAW and NL RAW are conditioned by dividing each of the sampled sensor inputs by the value RTHETA. Respective NH and NL engine performance maps 45a, 45b developed by the engine manufacturer are applied to the resulting conditioned values of NH FUZ and NL FUZ. These values are then multiplied by DELTA*RTHETA and a common reference value KNPREF=100 (relates to the normal governed speed of the power turbine and helicopter rotor) to arrive at the engine horsepower values HP NH and HP NL which pass through respective hard fault trips NH HFLT and NL HFLT before submission to summation block 50.

The sampled raw compressor discharge pressure $P_3$ RAW is conditioned by a first order lag filters 40d and divided by the value DELTA. A $P_3$ engine performance map 45c is applied to the resulting conditioned value $P_3$ FUZ which is subsequently multiplied by DELTA*RTHETA and a common reference value KNPREF=100 to arrive at the engine horsepower value HP $P_3$ which is passed through a hard fault trip $P_3$ HFLT before submission to summation block 50.

The sampled turbine inlet gas temperature $T_{4.5}$ RAW is conditioned by dividing the sampled input by the value RTHETA. A $T_{4.5}$ engine map 45d is applied to the resulting conditioned value $T_{4.5}$ FUZ. This value is then multiplied by DELTA*RTHETA and a common reference value KNPREF=100 to arrive at the horsepower value HP $T_{4.5}$ which is passed through a hard fault trips $T_{4.5}$ HFLT before submission to summation block 50.

The three sampled fuel flows WFCL RAW, WFOL RAW and WFTF RAW are conditioned by respective first order lag filters 40e–40g. The three filtered values are then divided by the value DELTA*RTHETA, resulting in the fuzzy fuel flow values WFCL FUZ, WFOL FUZ and WFTF FUZ. A WF engine map 45g is applied to each of the resulting fuzzy values, which are then multiplied by DELTA*RTHETA and a common reference value KNPREF=100 to arrive at the horsepower values HP WFCL, HP WFOL and HP WFTF. These values are passed through respective hard fault trips WFCL HFLT, WFOL HFLT and WFTF HFLT before submission to summation block 50.

The sum of the nine (9) horsepower values from summation block 50 is then divided by the SENSOR SUM to arrive at the HP AVG1.

First-Pass Sensor Horsepower Deviation Calculations

As noted above with reference to FIG. 3, at logic block 18, a horsepower deviation ratio HP [SENSOR] DEV RAT1 is computed for each of the nine engine sensors relative to all of the other engine sensors, using the SENSOR SUM as an input along with the horsepower deviations from the first mean horsepower HP [SENSOR] DEV1 for each of the sensors. More particularly, referring to FIG. 6, the mean horsepower HP AVG1 is used at logic block 16 to calculate the horsepower deviation HP [SENSOR] DEV1 for each of the nine engine sensors by subtracting the HP AVG1 from the horsepower value for each sensor HP [SENSOR]. The absolute value of each HP [SENSOR] DEV1 is then determined and submitted to logic block 18 to calculate a horsepower deviation ratio HP [SENSOR] DEV RAT1 for each sensor relative to all other sensors. By way of example, the HP NP DEV RAT1 can be calculated in the following manner:

$$HP\ NP\ DEV\ RAT1 = \frac{\begin{array}{l}(HP\ NP\ DEV1/HP\ NR\ DEV1) + \\ (HP\ NP\ DEV1/HP\ NH\ DEV1) + \\ (HP\ NP\ DEV1/HP\ NL\ DEV1) + \\ (HP\ NP\ DEV1/HP\ P3\ DEV1) + \\ (HP\ NP\ DEV1/HP\ T4.5\ DEV1) + \\ (HP\ NP\ DEV1/HP\ WFCL\ DEV1) + \\ (HP\ NP\ DEV1/HP\ WFOL\ DEV1) + \\ (HP\ NP\ DEV1/HP\ WFTF\ DEV1)\end{array}}{SENSOR\ SUM}$$

Those skilled in the art will readily appreciate that in performing the deviation ratio calculation for the nine sensors, any failed sensor should be eliminated from the calculation to avoid any zero denominators. Consequently, the system will set any HP [FAILED SENSOR] DEV RAT1 equal to zero at logic block 18.

Figure 6A:
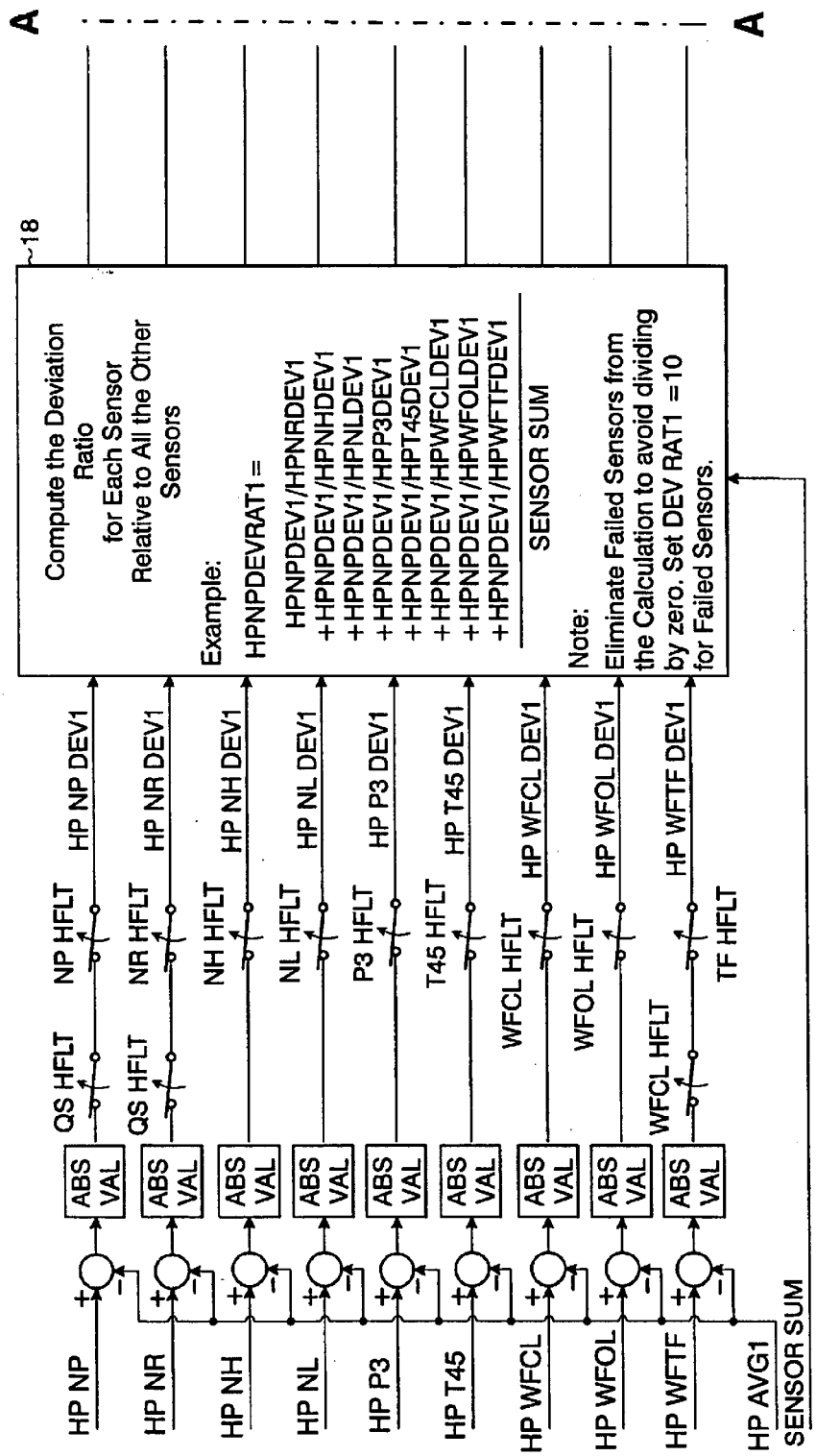
FIG. 6 (includes FIGS. 6A and 6B) is a detailed schematic representation of the first-pass sensor horsepower deviation calculation logic of the fault detection system of FIG. 3.
Figure 6B:
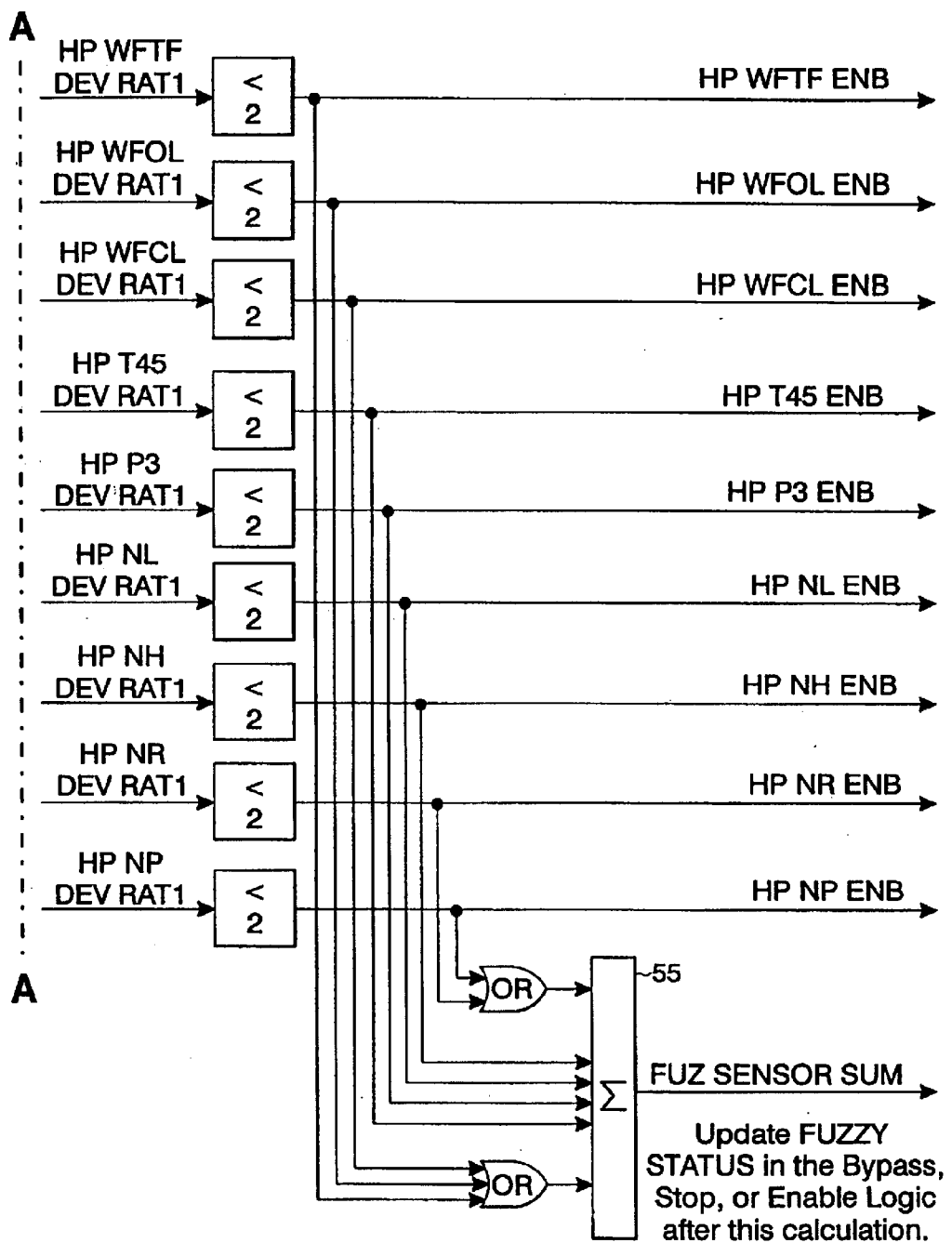
Figure 7A:
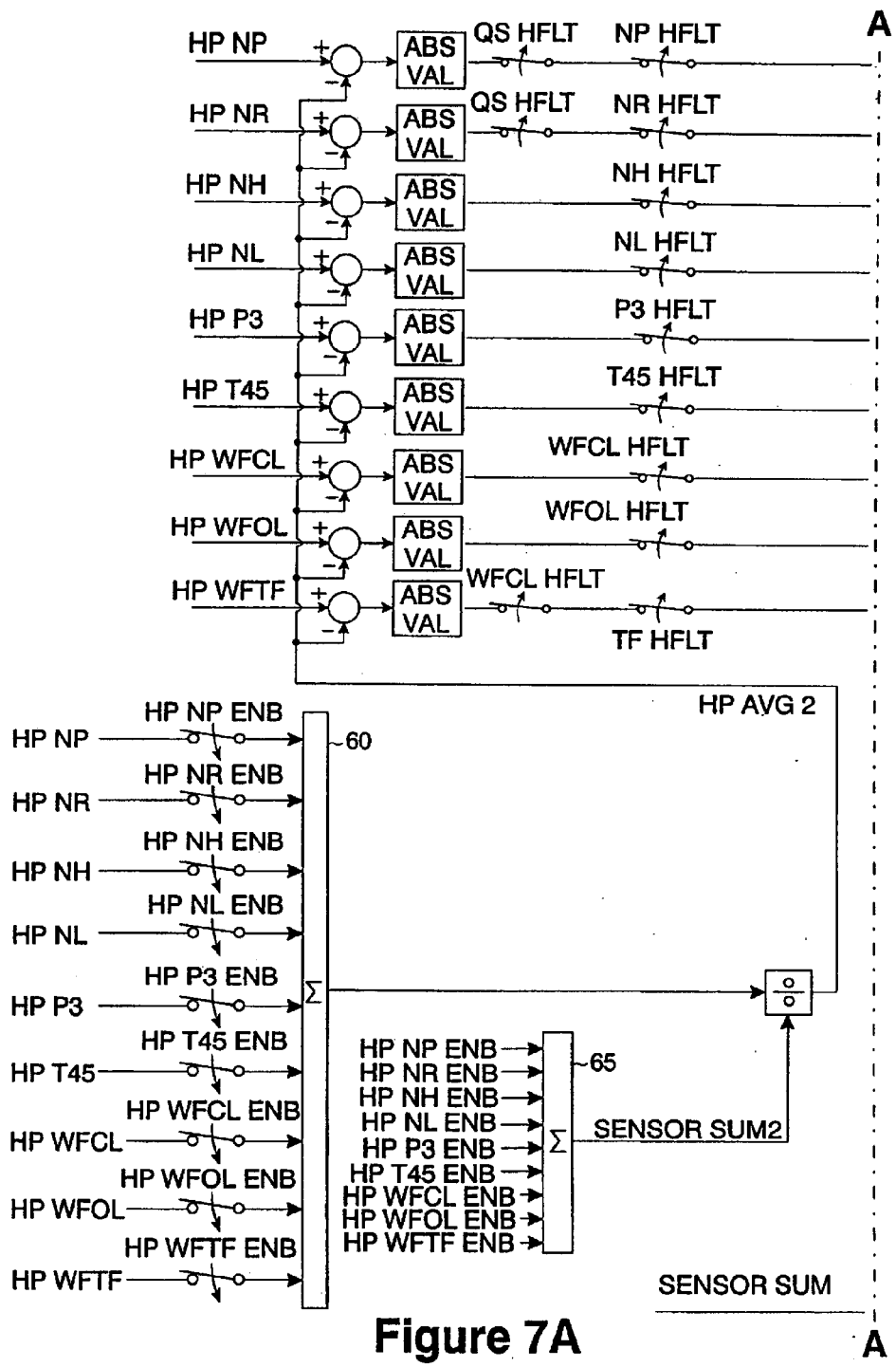
FIG. 7 (includes FIGS. 7A–7D) is a detailed schematic representation of the second-pass sensor horsepower deviation calculation logic of the fault detection system of FIG. 3.
Figure 7B:
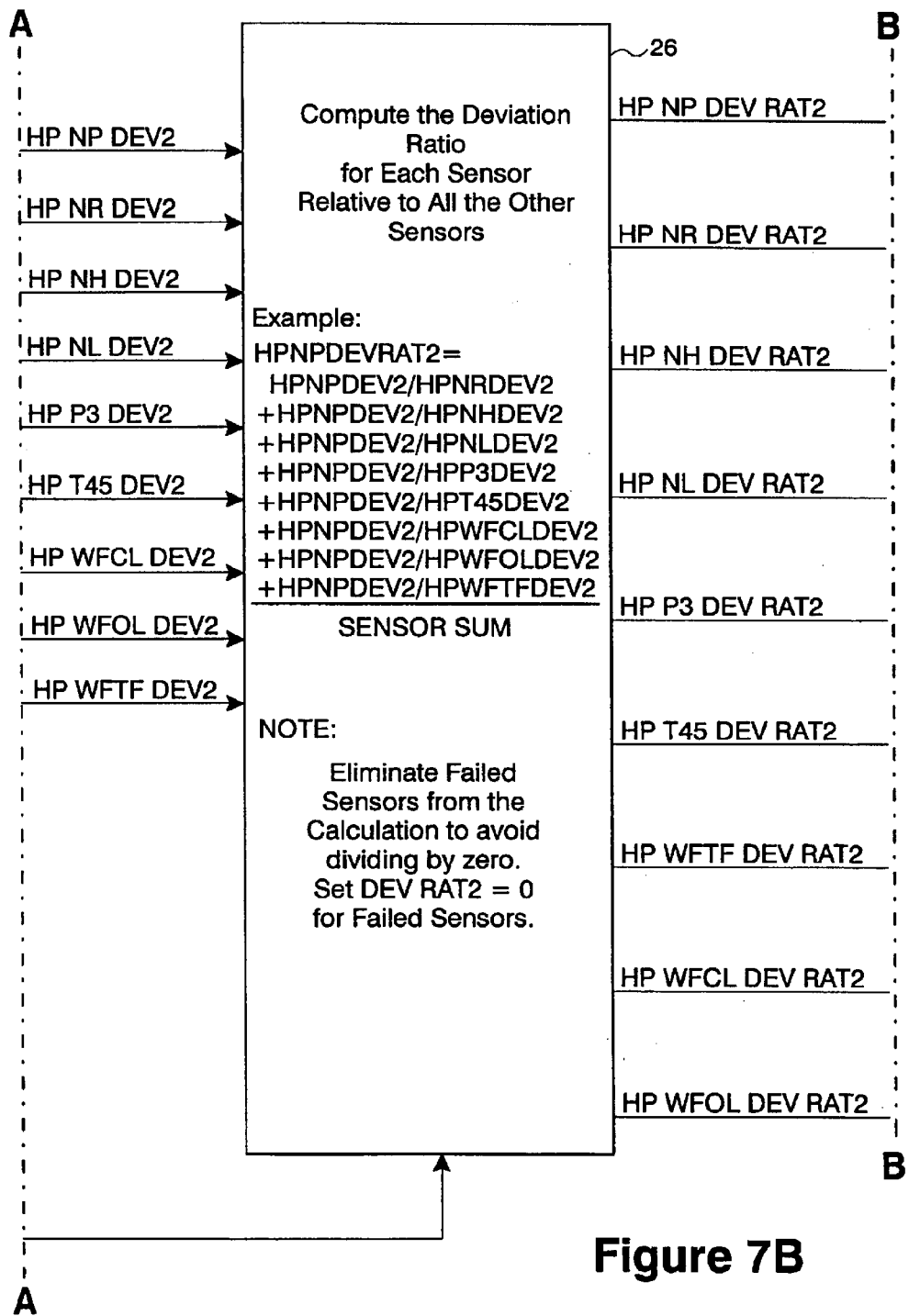
Figure 7C:
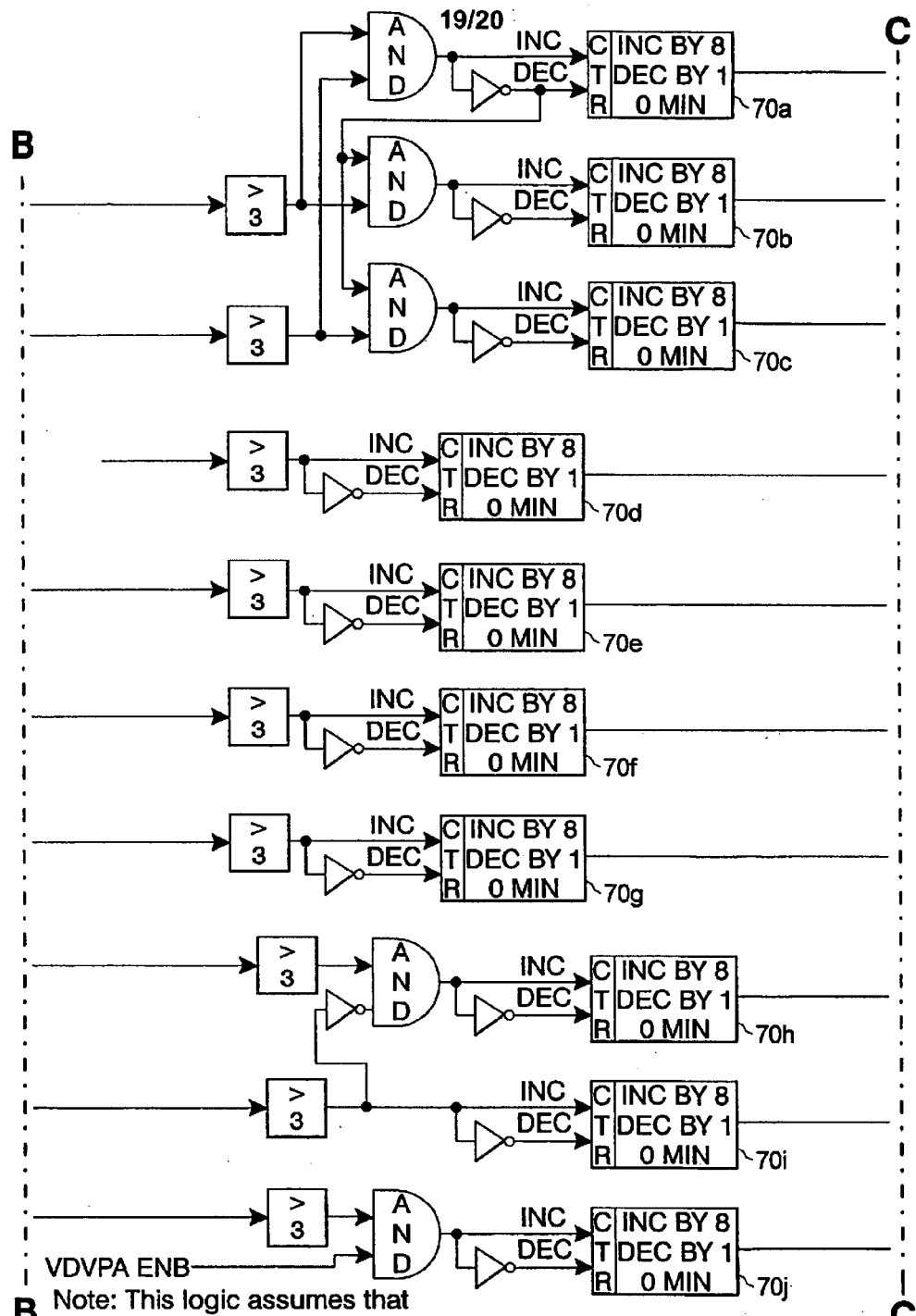
Figure 7D:
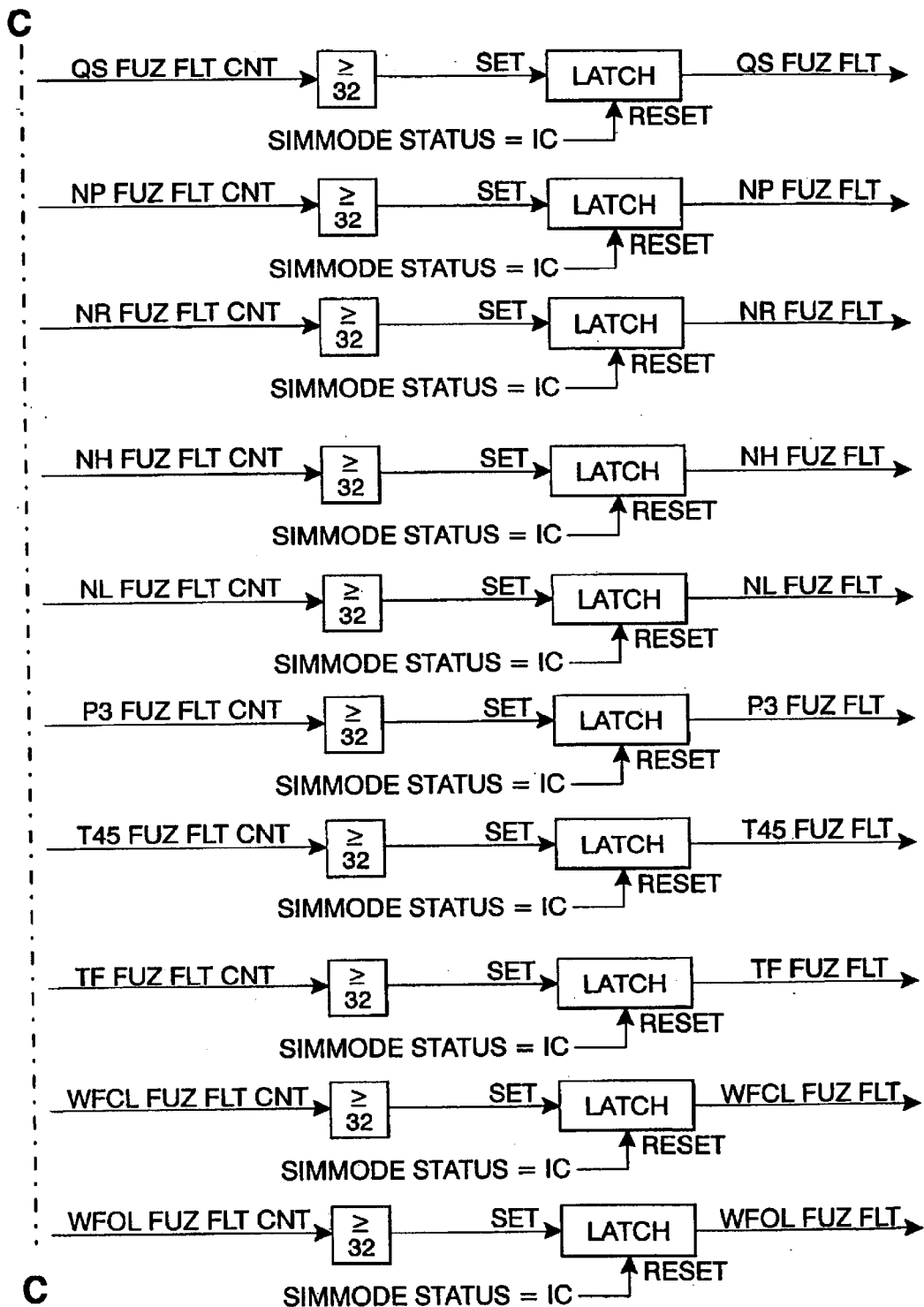

With continuing reference to FIG. 6 in conjunction with FIG. 3, a ratiometric comparison is conducted at logic block 20, whereby the nine horsepower deviation ratios HP [SENSOR] DEV RAT1 are analyzed to determine which sensor has the largest deviation from the mean horsepower HP AVG1. More particularly, the system determines whether an HP [SENSOR] DEV RAT1 is greater than 2. If the answer to this query is negative, the sensor remains enabled and the HP [SENSOR] ENB value is submitted to logic block 22 for re-calculation of the mean horsepower. However, if the answer to the query is in the affirmative, in that a HP [SENSOR] DEV RAT1 is greater than 2, that sensor is disabled. In other words, the sensor(s) with the largest deviation would be disabled. For example, as illustrated in FIG. 1, the sensor with the largest deviation is the NH sensor, and it would be disabled.

The remaining enabled sensors provide a FUZ SENSOR SUM at summation block 55, which is used at logic block 30, as described with respect to FIGS. 3 and 4. There are six possible inputs to determine the FUZ SENSOR SUM, since the HP NP ENB and HP NR ENB flow through a common logic gate, as do the three fuel flow values WFTF, WFOL and WFCL.

Second Mean Horsepower Calculation

At logic block 22, after disabling the sensor with the largest deviation from the first mean horsepower HP AVG1, the horsepower for each of remaining enabled sensors HP [SENSOR] ENB is used to calculate a second mean horsepower HP AVG2. More particularly, as illustrated in FIG. 7, the number of enabled sensors is computed at summation block 60. This value is then divided by the number of enabled sensors SENSOR SUM2 which is determined at summation block 65 to arrive at the second mean horsepower value HP AVG2. The value of HP AVG2 is then used to in the second horsepower deviation calculations.

Second-Pass Sensor Horsepower Deviation Calculations

As noted above with reference to FIG. 3, at logic block 24, using the second mean horsepower HP AVG2, the horsepower deviation from the second mean horsepower HP [SENSOR] DEV2 is calculated for each of the enabled sensors. As illustrated in FIG. 7, this is accomplished by subtracting the HP AVG2 from the horsepower value for each sensor HP [SENSOR]. The absolute value of each HP [SENSOR] DEV2 is then determined and submitted to logic block 26 to calculate a horsepower deviation ratio HP [SENSOR] DEV RAT2 for each sensor relative to all other remaining sensors. By way of example, the HP NP DEV RAT2 can be calculated in the following manner:

$$HP\ NP\ DEV\ RAT2 = \frac{\begin{array}{l}(HP\ NP\ DEV2/HP\ NR\ DEV2) + \\ (HP\ NP\ DEV2/HP\ NH\ DEV2) + \\ (HP\ NP\ DEV2/HP\ NL\ DEV2) + \\ (HP\ NP\ DEV2/HP\ P3\ DEV2) + \\ (HP\ NP\ DEV2/HP\ T4.5\ DEV2) + \\ (HP\ NP\ DEV2/HP\ WFCL\ DEV2) + \\ (HP\ NP\ DEV2/HP\ WFOL\ DEV2) + \\ (HP\ NP\ DEV2/HP\ WFTF\ DEV2)\end{array}}{SENSOR\ SUM}$$

Once again, those skilled in the art will readily appreciate that in performing the second deviation ratio calculation for the nine sensors, any failed sensor should be eliminated from the calculation to avoid any zero denominators. Consequently, the system will set any HP [FAILED SENSOR] DEV RAT2 equal to 0 at logic block 26.

With continuing reference to FIG. 7 in conjunction with FIG. 3, the remaining horsepower deviation ratios are compared to predefined go/no-go limits. In this case, the remaining horsepower deviation ratios HP [SENSOR] DEV RAT2 are analyzed to determine whether any ratio is greater than the go/no-go limit of 3. A number of 3 or greater will indicate that the suspect sensor is significantly different from the overall mean than the average difference of the other sensors from the overall mean, i.e., the suspect sensor stands out as not matching the tracking to the mean seen by the other sensors, see FIG. 2, where NH is bad and the rest of the sensors are good.

Fault counters 70b–70j are provided for each of the sensors that provided raw data input to the system including the NP, NR, NH, NL, $P_3$, $T_{4.5}$, WFCL, WFOL and WFTF sensors. The counters are set to increment by 8 if the HP [SENSOR] DEV RAT2 for a particular sensor exceeds the predefined go/no-go limit, and decrement by 1 if the HP [SENSOR] DEV RAT2 for a particular sensor does not exceed the predefined go/no-go limit. The fault counters for the NP and NR sensors have coordinated control logic with a counter 70a representing the QS sensor, since the shaft horsepower for NP and NR are initially derived from the QS sensor signal. In addition, the WFCL and WFTF fault counters have coordinated control logic, and the WFOL fault counter has control logic which receives a channel enabling signal from a variable displacement vane pump VDVPA ENB. In this instance, the control logic assumes that if the current sensed signal for WFOL is failed, there will be a channel switchover.

With continuing reference to FIG. 7, the system then determines whether the sensor fault count values [SENSOR] FUZ FLT CNT exceed a predetermined limit. In this case, the predetermined limit is 32, or four times the increment count of 8. Therefore, if the HP [SENSOR] DEV RAT2 for a sensor exceeds the predetermined go/no-go limit more than four times, a sensor fault [SENSOR] FUZ FLT will be declared for that engine sensor. Based on the control logic of the system, such a fault declaration would be considered plausible.

Although the system and method of the subject invention has been described with respect to preferred embodiments, those skilled in the art will readily appreciate that changes and modifications may be made thereto without departing from the spirit and scope of the present invention as defined by the appended claims.

What is claimed is:

1. A method of detecting engine sensor faults comprising the steps of:
    a) computing engine shaft horsepower for each of a plurality of engine sensors based upon respective input signals therefrom;
    b) computing a first mean horsepower from the plurality of engine sensors;
    c) computing the horsepower deviation from the first mean horsepower for each engine sensor;
    d) computing a horsepower deviation ratio for each engine sensor relative to all other engine sensors;
    e) disabling the engine sensor with the largest deviation from the first mean horsepower based upon the horsepower deviation ratio thereof;
    f) computing a second mean horsepower after disabling the sensor with the largest deviation from the first mean horsepower;
    g) computing the horsepower deviation from the second mean horsepower for each engine sensor;
    h) re-computing the horsepower deviation ratio for each engine sensor relative to all other engine sensors;
    i) comparing the horsepower deviation ratios to predefined limits; and
    j) declaring a sensor fault if the horsepower deviation ratio for an engine sensor exceeds a predefined limit.

2. A method according to claim 1, further comprising the step of sampling input signals from a plurality of engine sensors.

3. A method according to claim 2, wherein the step of sampling input signals from a plurality of engine sensors includes sampling the power turbine speed signal, the main rotor speed signal, the high pressure spool speed signal, the low pressure spool speed signal, the high pressure compressor discharge pressure signal, the turbine inlet gas temperature, and at least one fuel flow rate signal.

4. A method according to claim 3, wherein the step of computing engine shaft horsepower with respect to power turbine speed, main rotor speed, high pressure compressor discharge pressure and at least one fuel flow rate includes conditioning the sampled power turbine speed signal, main rotor speed signal, high pressure compressor discharge pressure signal and the at least one fuel flow rate signal with respective first order lag filters.

5. A method according to claim 4, wherein the step of computing engine shaft horsepower with respect to power turbine speed and main rotor speed includes multiplying the filtered power turbine speed signal and the main rotor speed signal by the engine shaft torque signal, after the engine shaft torque signal has been conditioned by a first order lag filter.

6. A method according to claim 4, wherein the step of computing engine shaft horsepower with respect to high pressure spool speed, low pressure spool speed includes and high pressure compressor discharge pressure includes applying respective engine performance maps to the high pressure spool speed signal, low pressure spool speed signal and high pressure compressor discharge pressure signal.

7. A method according to claim 4, wherein the step of computing engine shaft horsepower with respect to high pressure compressor discharge pressure and at least one fuel flow rate further includes applying respective engine performance maps to the conditioning high pressure compressor discharge pressure signal and the at least one fuel flow rate signal.

* * * * *